United States Patent
Hoffman

(10) Patent No.: US 8,458,257 B2
(45) Date of Patent: *Jun. 4, 2013

(54) SYSTEM AND METHOD FOR IDENTIFYING TRANSIENT FRIENDS

(75) Inventor: Michael T. Hoffman, Raleigh, NC (US)

(73) Assignee: Domingo Enterprises, LLC, Portsmouth, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/533,056

(22) Filed: Jun. 26, 2012

(65) Prior Publication Data

US 2012/0271885 A1    Oct. 25, 2012

Related U.S. Application Data

(63) Continuation of application No. 13/036,370, filed on Feb. 28, 2011, now Pat. No. 8,209,416, which is a continuation of application No. 12/013,147, filed on Jan. 11, 2008, now Pat. No. 8,024,431.

(60) Provisional application No. 61/016,074, filed on Dec. 21, 2007.

(51) Int. Cl.
*G06F 15/16* (2006.01)
(52) U.S. Cl.
USPC ............................ 709/204; 709/224; 709/220
(58) Field of Classification Search
USPC .................... 709/220, 223–224, 204–205
See application file for complete search history.

(56) References Cited

U.S. PATENT DOCUMENTS

| | | | |
|---|---|---|---|
| 5,493,692 | A | 2/1996 | Theimer et al. |
| 5,754,939 | A | 5/1998 | Herz et al. |
| 5,796,727 | A | 8/1998 | Harrison et al. |
| 5,903,901 | A | 5/1999 | Kawakura et al. |
| 5,949,776 | A | 9/1999 | Mahany et al. |
| 6,014,090 | A | 1/2000 | Rosen et al. |

(Continued)

FOREIGN PATENT DOCUMENTS

| | | |
|---|---|---|
| CN | 1493064 A | 4/2004 |
| GB | 2399928 | 9/2004 |

(Continued)

OTHER PUBLICATIONS

"Anthem—Overview," at <http://www.intercastingcorp.com/platform/anthem>, copyright 2004-2007, Intercasting Corp., printed Jan. 16, 2008, 2 pages.

(Continued)

*Primary Examiner* — Philip B Tran

(57) ABSTRACT

A system and method for identifying transient friends for a social network of a user are provided. A transient friend processing function obtains locations of a number of users or locations otherwise associated with the number of users. In order to identify transient friends for a first user, the transient friend processing function identifies other users associated with locations within a proximate area of the first user. For each of the identified users, the transient friend processing function compares a user profile of the first user to a user profile of the identified user to determine whether to add the identified user as a transient friend of the first user. If the transient friend processing function determines that the identified friend is to be added as a transient friend of the first user, the identified friend is then added as a transient friend of the first user.

38 Claims, 7 Drawing Sheets

U.S. PATENT DOCUMENTS

| | | | |
|---|---|---|---|
| 6,041,311 A | 3/2000 | Chislenko et al. | |
| 6,049,711 A | 4/2000 | Ben-Yehezkel et al. | |
| 6,240,069 B1 | 5/2001 | Alperovich et al. | |
| 6,349,203 B1 | 2/2002 | Asaoka et al. | |
| 6,456,234 B1 | 9/2002 | Johnson | |
| 6,529,136 B2 | 3/2003 | Cao et al. | |
| 6,539,232 B2 | 3/2003 | Hendrey et al. | |
| 6,542,750 B2 | 4/2003 | Hendrey et al. | |
| 6,618,593 B1 | 9/2003 | Drutman et al. | |
| 6,675,015 B1 | 1/2004 | Martini et al. | |
| 6,675,268 B1 | 1/2004 | DeKoning et al. | |
| 6,853,841 B1 | 2/2005 | St. Pierre | |
| 6,876,642 B1 | 4/2005 | Adams et al. | |
| 6,885,362 B2 | 4/2005 | Suomela | |
| 6,937,860 B2 | 8/2005 | Jahn | |
| 6,947,571 B1 | 9/2005 | Rhoads et al. | |
| 6,954,443 B2 | 10/2005 | Forstadius et al. | |
| 6,970,703 B2 | 11/2005 | Fuchs et al. | |
| 6,975,266 B2 | 12/2005 | Abraham et al. | |
| 6,990,497 B2 | 1/2006 | O'Rourke et al. | |
| 7,020,710 B2 | 3/2006 | Weber et al. | |
| 7,035,618 B2 | 4/2006 | Schnurr | |
| 7,035,912 B2 | 4/2006 | Arteaga | |
| 7,047,315 B1 | 5/2006 | Srivastava | |
| 7,085,571 B2 | 8/2006 | Kalhan et al. | |
| 7,134,040 B2 | 11/2006 | Ayres | |
| 7,171,018 B2 | 1/2007 | Rhoads et al. | |
| 7,200,638 B2 | 4/2007 | Lake | |
| 7,203,753 B2 | 4/2007 | Yeager et al. | |
| 7,206,568 B2 | 4/2007 | Sudit | |
| 7,218,611 B2 | 5/2007 | Mimura et al. | |
| 7,240,106 B2 | 7/2007 | Cochran et al. | |
| 7,249,367 B2 | 7/2007 | Bove, Jr. et al. | |
| 7,260,638 B2 | 8/2007 | Crosbie | |
| 7,266,595 B1 | 9/2007 | Black et al. | |
| 7,269,854 B2 | 9/2007 | Simmons et al. | |
| 7,272,357 B2 | 9/2007 | Nishiga et al. | |
| 7,319,379 B1 | 1/2008 | Melvin | |
| 7,340,768 B2 | 3/2008 | Rosenberger | |
| 7,343,160 B2 | 3/2008 | Morton | |
| 7,359,894 B1 | 4/2008 | Liebman et al. | |
| 7,373,109 B2 | 5/2008 | Pohja et al. | |
| 7,454,518 B1 | 11/2008 | Cain et al. | |
| 7,509,131 B2 | 3/2009 | Krumm et al. | |
| 7,512,702 B1 | 3/2009 | Srivastava et al. | |
| 7,516,212 B2 | 4/2009 | Nguyen et al. | |
| 7,620,404 B2 | 11/2009 | Chesnais et al. | |
| 7,668,832 B2 | 2/2010 | Yeh et al. | |
| 7,684,815 B2 | 3/2010 | Counts et al. | |
| 7,707,246 B1 * | 4/2010 | Issa et al. | 709/204 |
| 7,920,876 B2 | 4/2011 | Rahman | |
| 8,010,601 B2 | 8/2011 | Jennings et al. | |
| 8,024,431 B2 | 9/2011 | Hoffman | |
| 8,108,501 B2 * | 1/2012 | Birnie et al. | 709/203 |
| 8,145,699 B2 * | 3/2012 | Parham et al. | 709/202 |
| 8,209,416 B2 | 6/2012 | Hoffman | |
| 2001/0032335 A1 | 10/2001 | Jones | |
| 2001/0039659 A1 | 11/2001 | Simmons et al. | |
| 2001/0048449 A1 | 12/2001 | Baker | |
| 2001/0054043 A1 * | 12/2001 | Harlan | 709/203 |
| 2002/0019829 A1 | 2/2002 | Shapiro | |
| 2002/0086659 A1 | 7/2002 | Lauper | |
| 2002/0086676 A1 | 7/2002 | Hendrey et al. | |
| 2003/0011467 A1 | 1/2003 | Suomela | |
| 2003/0022675 A1 | 1/2003 | Mergler | |
| 2003/0050062 A1 | 3/2003 | Chen et al. | |
| 2003/0065721 A1 | 4/2003 | Roskind | |
| 2003/0212802 A1 | 11/2003 | Rector et al. | |
| 2003/0229549 A1 | 12/2003 | Wolinsky et al. | |
| 2004/0024912 A1 | 2/2004 | Fukao et al. | |
| 2004/0103280 A1 | 5/2004 | Balfanz et al. | |
| 2004/0107219 A1 | 6/2004 | Rosenberger | |
| 2004/0148393 A1 | 7/2004 | Breiter et al. | |
| 2004/0160307 A1 | 8/2004 | Saikkonen et al. | |
| 2004/0199661 A1 | 10/2004 | Murdock | |
| 2004/0203901 A1 * | 10/2004 | Wilson et al. | 455/456.1 |
| 2004/0225519 A1 | 11/2004 | Martin | |
| 2005/0015800 A1 | 1/2005 | Holcomb | |
| 2005/0021369 A1 | 1/2005 | Cohen et al. | |
| 2005/0025320 A1 | 2/2005 | Barry | |
| 2005/0033780 A1 | 2/2005 | Simelius et al. | |
| 2005/0038876 A1 | 2/2005 | Chaudhuri | |
| 2005/0059379 A1 | 3/2005 | Sovio et al. | |
| 2005/0060350 A1 | 3/2005 | Baum et al. | |
| 2005/0071221 A1 | 3/2005 | Selby | |
| 2005/0160270 A1 | 7/2005 | Goldberg et al. | |
| 2005/0171799 A1 * | 8/2005 | Hull et al. | 705/26 |
| 2005/0174975 A1 | 8/2005 | Mgrdechian et al. | |
| 2005/0197846 A1 | 9/2005 | Pezaris et al. | |
| 2005/0245233 A1 | 11/2005 | Anderson | |
| 2005/0251453 A1 | 11/2005 | Lu | |
| 2005/0251565 A1 | 11/2005 | Weel | |
| 2005/0251566 A1 | 11/2005 | Weel | |
| 2005/0251576 A1 | 11/2005 | Weel | |
| 2005/0251807 A1 | 11/2005 | Weel | |
| 2005/0261001 A1 | 11/2005 | Marley et al. | |
| 2005/0272413 A1 | 12/2005 | Bourne | |
| 2005/0280557 A1 | 12/2005 | Jha et al. | |
| 2006/0059142 A1 | 3/2006 | Zvinyatskovsky et al. | |
| 2006/0085419 A1 | 4/2006 | Rosen | |
| 2006/0085821 A9 | 4/2006 | Simmons et al. | |
| 2006/0123080 A1 | 6/2006 | Baudino et al. | |
| 2006/0149628 A1 | 7/2006 | Chefalas et al. | |
| 2006/0149631 A1 | 7/2006 | Brazell et al. | |
| 2006/0168264 A1 | 7/2006 | Baba et al. | |
| 2006/0218225 A1 | 9/2006 | Hee Voon et al. | |
| 2006/0223518 A1 | 10/2006 | Haney | |
| 2006/0229939 A1 | 10/2006 | Bhakta et al. | |
| 2006/0256959 A1 | 11/2006 | Hymes | |
| 2006/0287915 A1 | 12/2006 | Boulet et al. | |
| 2007/0121843 A1 | 5/2007 | Atazky et al. | |
| 2007/0136132 A1 | 6/2007 | Weiser et al. | |
| 2007/0150444 A1 | 6/2007 | Chesnais et al. | |
| 2007/0168254 A1 | 7/2007 | Steelberg et al. | |
| 2007/0174243 A1 | 7/2007 | Fritz | |
| 2007/0205276 A1 | 9/2007 | Sodan et al. | |
| 2007/0218867 A1 | 9/2007 | Mononen et al. | |
| 2007/0218900 A1 | 9/2007 | Abhyanker | |
| 2007/0249327 A1 | 10/2007 | Nurmi | |
| 2007/0260508 A1 | 11/2007 | Barry et al. | |
| 2007/0271136 A1 | 11/2007 | Strauss et al. | |
| 2007/0282621 A1 | 12/2007 | Altman et al. | |
| 2008/0033809 A1 | 2/2008 | Black et al. | |
| 2008/0081638 A1 | 4/2008 | Boland et al. | |
| 2008/0091834 A1 * | 4/2008 | Norton | 709/229 |
| 2008/0097999 A1 | 4/2008 | Horan | |
| 2008/0133759 A1 | 6/2008 | Weel | |
| 2008/0140650 A1 | 6/2008 | Stackpole | |
| 2008/0154895 A1 * | 6/2008 | Carmony | 707/6 |
| 2008/0182591 A1 | 7/2008 | Krikorian | |
| 2008/0288375 A1 | 11/2008 | Uhrig et al. | |
| 2008/0312946 A1 | 12/2008 | Valentine et al. | |
| 2009/0019004 A1 * | 1/2009 | Abhyanker | 707/3 |
| 2009/0030999 A1 | 1/2009 | Gatzke et al. | |
| 2009/0047972 A1 * | 2/2009 | Neeraj | 455/456.1 |
| 2009/0055229 A1 | 2/2009 | Lidgren et al. | |
| 2009/0082038 A1 | 3/2009 | McKiou et al. | |
| 2009/0085724 A1 | 4/2009 | Naressi et al. | |
| 2009/0156160 A1 | 6/2009 | Evans et al. | |
| 2009/0164459 A1 | 6/2009 | Jennings et al. | |
| 2009/0164574 A1 | 6/2009 | Hoffman | |
| 2009/0315670 A1 | 12/2009 | Naressi et al. | |
| 2012/0072580 A1 | 3/2012 | Hoffman | |

FOREIGN PATENT DOCUMENTS

| | | |
|---|---|---|
| WO | WO 99/05877 | 2/1999 |
| WO | WO 01/24551 | 4/2001 |
| WO | WO 02/29506 | 4/2002 |
| WO | WO 02/062092 | 8/2002 |
| WO | WO 2006/082566 | 8/2006 |

OTHER PUBLICATIONS

"Apple—iPod classic," at <http://www.apple.com/ipodclassic/>, printed Oct. 26, 2007, 1 page.

"eHarmony," http://eharmony.com/, copyright 2000-2008 eHarmony.com, printed Jan. 16, 2008, 1 page.

"Friendster—Home," http://www.friendster.com/, copyright 2002-2007 Friendster, Inc., printed Jan. 16, 2008, 1 page.

"icq," http://www.icg.com/,copyright 1998-2008 ICQ Inc., printed Jan. 16, 2008, 2 pages.

"Internet Relay Chat—Wikipedia, the free encyclopedia," http://en.wikipedia.org/wiki/IRC, printed Nov. 16, 2007, 11 pages.

"Jabber SoftwareFoundation," http://www.jabber.org/, copyright 1999-2005 the Jabber Software Foundation, printed Jan. 16, 2008, 3 pages.

"mobile community, free sms, mobile dating, text flirting and friends networking—playtxt . . . ," http://web.archive.org/web/20070225125113rn_1/www.playtxtnet/playtxt.do, printed Jan. 16, 2008, 1 page.

"MySpace," at <http://www.myspace.com/>, copyright 2003-2008, MySpace.com, printed Jan. 16, 2008, 2 pages.

"Rabble—Social networking for your phone," http://www.rabble.com/, copyright 2005-2008 Intercasting Corp., printed Jan. 16, 2008, 1 page.

"SmallPlanet: Home," http://web.archive.org/web/20061105030323/http://www.smallplanetnet/, copyright 2005 SmallPlanet.net, printed Jan. 16, 2008, 1 page.

"Technology—Geo Targeting," http://www.invidi.com/pp./itc_technology_05.html, copyright 2007, printed Nov. 18, 2008, 1 page.

"Windows Live Messenger—Overview," http://get.live.com/messenger/overview, copyright 2007 Microsoft Corp., printed Nov. 28, 2007, 1 page.

* cited by examiner

TIME 0

TIME 1

TIME 2

SYSTEM AND METHOD FOR IDENTIFYING TRANSIENT FRIENDS

RELATED APPLICATIONS

This patent application is a continuation of U.S. patent application Ser. No. 13/036,370 filed Feb. 28, 2011, entitled "SYSTEM AND METHOD FOR IDENTIFYING TRANSIENT FRIENDS," now U.S. Pat. No. 8,209,416, which is a continuation of U.S. patent application Ser. No. 12/013,147, filed Jan. 11, 2008, entitled "SYSTEM AND METHOD FOR IDENTIFYING TRANSIENT FRIENDS," now U.S. Pat. No. 8,024,431, which claims the benefit of provisional patent application Ser. No. 61/016,074, filed Dec. 21, 2007, the disclosures of which are hereby incorporated herein by reference in their entireties.

FIELD OF THE INVENTION

The present invention relates to social networking and more specifically relates to identifying transient friends for a social network.

BACKGROUND OF THE INVENTION

Today's digital world includes numerous examples of social networks. For example, chat applications, instant messaging applications, social networking websites, and the like enable a user to create a social network of friends with which the user interacts. With the proliferation of mobile devices such as mobile smart phones, an opportunity exists to extend traditional concepts of social networking among users of stationary devices to social networking among users of mobile devices. However, whether implemented among users of stationary devices or users of mobile devices, one issue with traditional social networks is the discovery of new friends. A user must typically have prior knowledge of users that he or she wishes to add as friends or manually select users to add as friends from a global list of users. Thus, there is a need for a system and method of identifying friends for social networks in a mobile environment.

SUMMARY OF THE INVENTION

The present invention relates to identifying transient friends for a social network. In general, a transient friend processing function obtains locations of a number of users or locations otherwise associated with the number of users. In order to identify transient friends for a first user, the transient friend processing function identifies other users associated with locations within a proximate area of the first user. For each of the identified users, the transient friend processing function compares a user profile of the first user to a user profile of the identified user to determine whether to add the identified user as a transient friend of the first user. If the transient friend processing function determines that the identified friend is to be added as a transient friend of the first user, the identified friend is then added as a transient friend of the first user.

More specifically, in one embodiment, in order to determine whether to add an identified user associated with a location within the proximate area of the first user as a transient friend of the first user, the transient friend processing function compares a user profile of the first user to a user profile of the identified user to provide a correlation score. If the correlation score is greater than an auto-add threshold, the identified user is added as a transient friend of the first user. If the correlation score is less than the auto-add threshold but greater than a manual-add threshold, the first user is notified of the identified user and enabled to choose whether to accept the identified user as a transient friend. If the first user accepts the identified user as a transient friend, the identified user is added as a transient friend of the first user.

The transient friend processing function also operates to monitor the transient friends of the first user. If a transient friend is no longer within the proximate area of the first user, the transient friend is removed as a transient friend of the first user. In one embodiment, a proximity exit delay is used such that the transient friend must remain outside of the proximate area of the first user for an amount of time defined by the proximity exit delay before being removed as a transient friend of the first user. Before removing the transient friend, the transient friend processing function may notify the first user and enable the first user to choose whether to promote the transient friend to a persistent friend or to allow the transient friend to be removed.

In one embodiment, a user recently removed as a transient friend of the first user is prevented from being added as a transient friend of the first user. More specifically, once a user is removed as a transient friend, a re-establish wait period is established such that the user cannot be added as a transient friend of the first user until the re-establish wait period has expired. This may be desirable to ensure that users near a boundary of the proximate area of the first user are not repeatedly added and removed as transient friends of the first user.

The first user may also choose to block a user from being added as a transient friend. More specifically, in one embodiment, the first user may select a user such as a user listed as a transient friend of the first user and choose to block that user. As a result, if the blocked user is a transient friend, the blocked user is removed as a transient friend. In addition, the blocked user is prevented from being added as a transient friend of the first user in the future. The first user may thereafter unblock the blocked user if desired.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 1 illustrates a system incorporating a transient friend processing function according to one embodiment of the present invention;

FIGS. 2A through 2C graphically illustrate the operation of the transient friend processing function of FIG. 1 according to one embodiment of the present invention;

Figure 1:
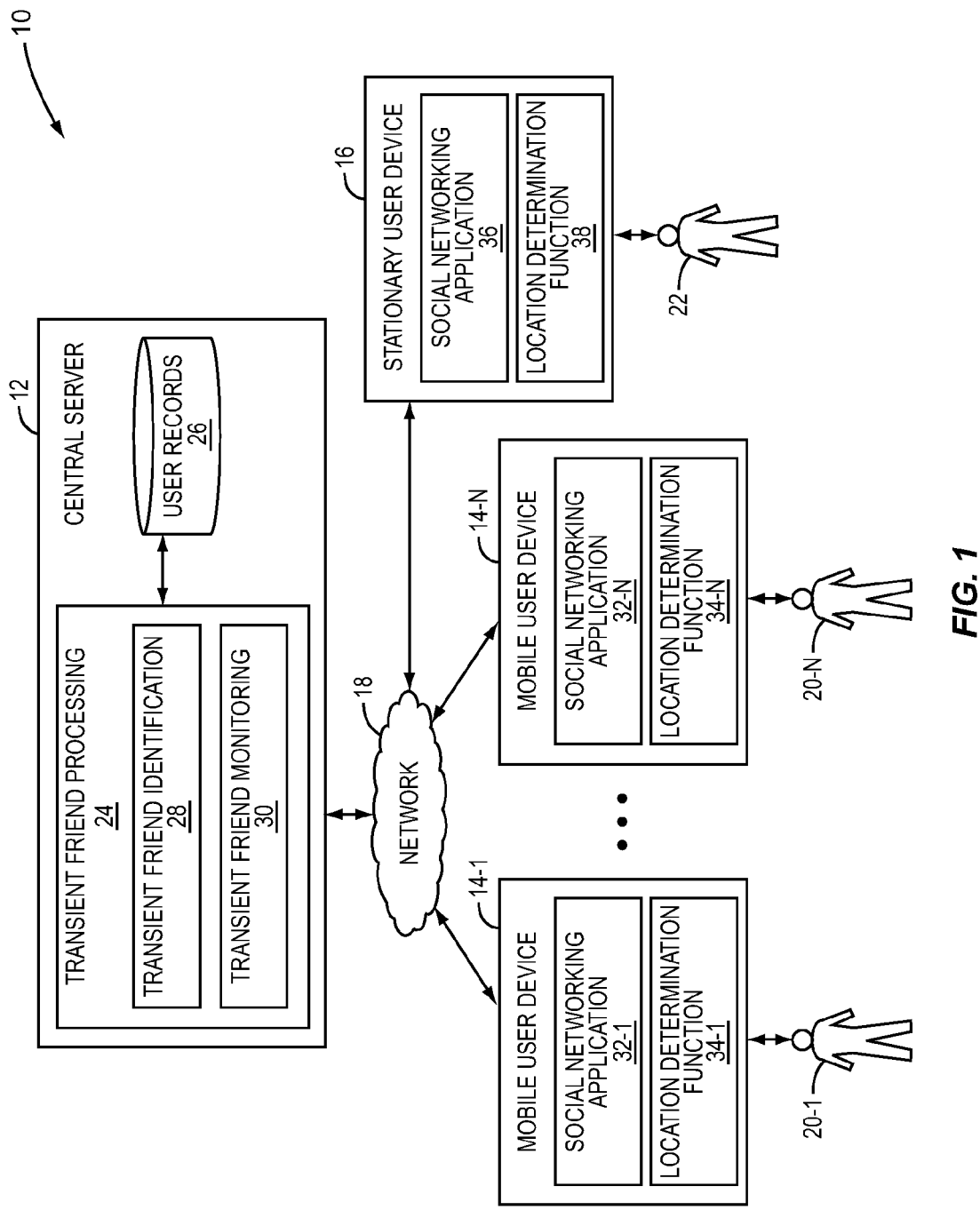
Figure 5:
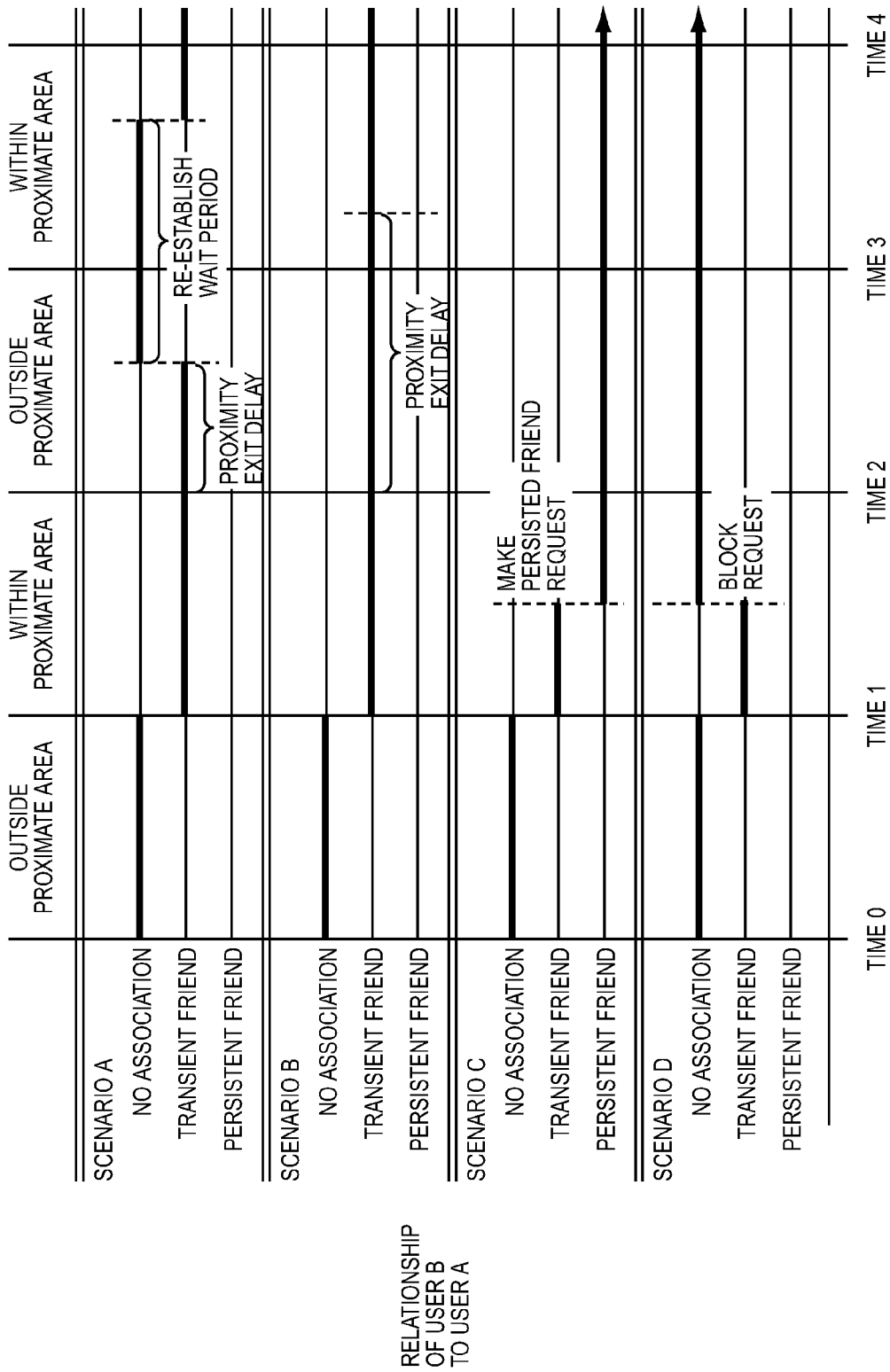
Figure 7:
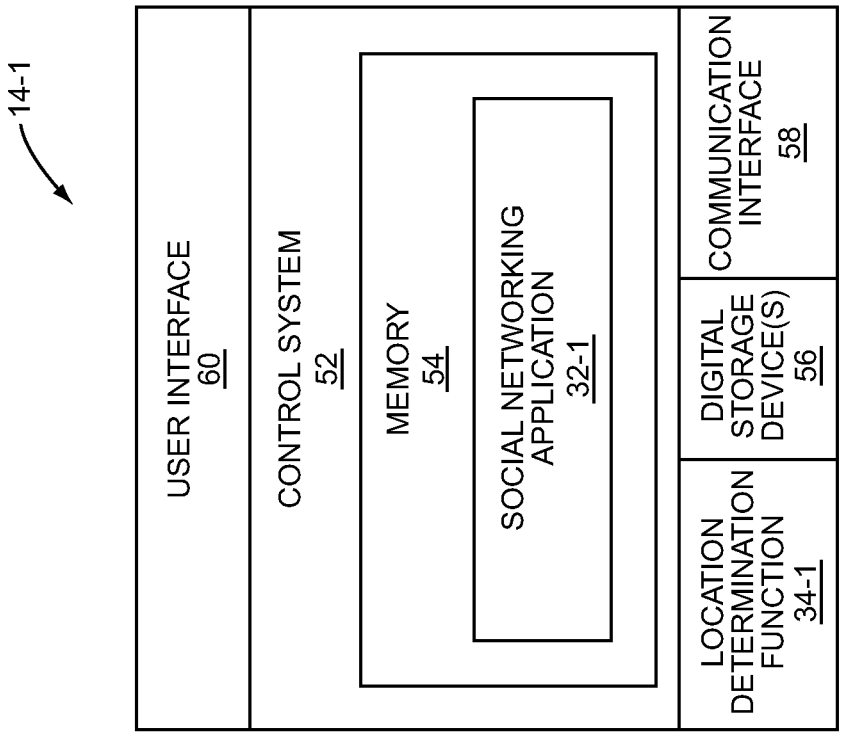
Figure 6:
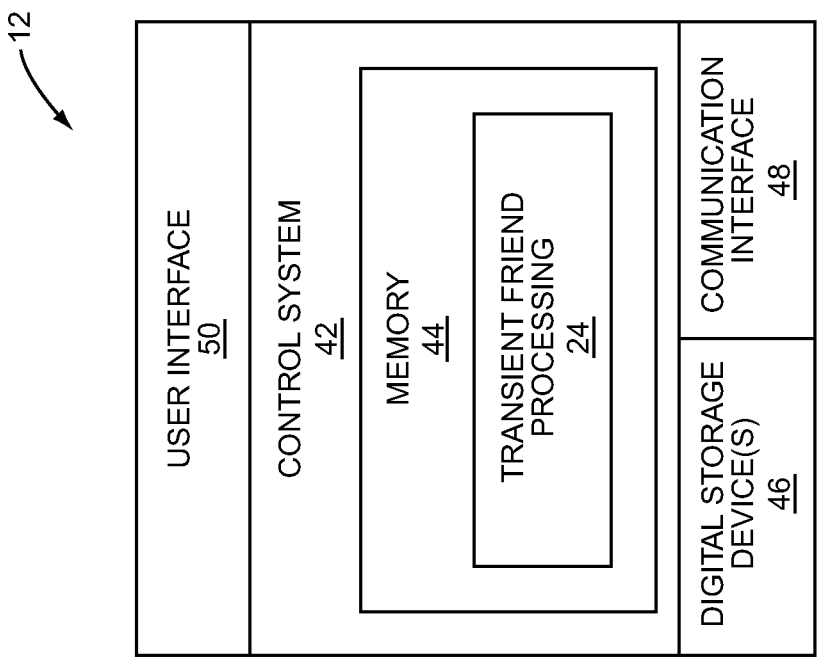

FIG. 5 graphically illustrates the concept of a proximity exit delay and a re-establish wait period according to one embodiment of the present invention;

FIG. 6 is a block diagram of the central server of FIG. 1 according to one embodiment of the present invention; and FIG. 7 is a block diagram of one of the user devices of FIG. 1 according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

FIG. 1 illustrates a system 10 for identifying and monitoring transient friends according to one embodiment of the present invention. In general, the system 10 includes a central server 12, a number of mobile user devices 14-1 through 14-N, and optionally one or more stationary user device 16 connected via a network 18. The network 18 is also referred to herein as a communication network. The network 18 may be any type Wide Area Network (WAN) or Local Area Network (LAN), or any combination thereof. In addition, the network 18 may include wired components, wireless components, or both wired and wireless components. Users 20-1 through 20-N are associated with the mobile user devices 14-1 through 14-N. A user 22 is associated with the stationary user device 16. Note that while a single central server 12 is illustrated in FIG. 1, the present invention is not limited thereto. The functionality of the central server 12 may alternatively be distributed among multiple servers.

The central server 12 includes a transient friend processing function 24 and user records 26. The transient friend processing function 24 is preferably implemented in software. However, the present invention is not limited thereto. The transient friend processing function 24 may be implemented in software, hardware, or a combination thereof. The transient friend processing function 24 includes a transient friend identification function 28 and a transient friend monitoring function 30. The transient friend identification function 28 generally operates to identify transient friends for each of the users 20-1 through 20-N and 22. As used herein, for a first user, a transient friend of the first user is a second user located within a proximate area of the first user, or otherwise associated with a location within the proximate area of the first user, and, optionally, having one or more attributes that are substantially similar to one or more attributes of the first user. Once identified as a transient friend, the second user's continued status as a transient friend of the first user is dependant upon the location of, or location associated with, the second user being within the proximate area of the first user and, optionally, substantial similarity between the one or more attributes of the second user and the one or more attributes of the first user.

The transient friend monitoring function 30 operates to monitor the transient friends of the users 20-1 through 20-N and 22. More specifically, using the user 20-1 as an example, the transient friend monitoring function 30 generally operates to monitor the transient friends of the user 20-1 such that other users from the users 20-2 through 20-N and 22 that are identified as the transient friends of the user 20-1 are removed as transient friends when they are no longer within the proximate area of the user 20-1. In one embodiment, a proximity exit delay is implemented such that a user is not removed as a transient friend until the user is outside of the proximate area of the user 20-1 for an amount of time defined by the proximity exit delay. This may be beneficial where a user is near a boundary of the proximate area of the user 20-1 and, as such, may enter and leave the proximate area of the user 20-1 frequently. The proximity exit delay, as well as a re-establish wait period discussed below, provides stability in such a scenario.

The user records 26 include a user record for each of the users 20-1 through 20-N and 22. Again using the user 20-1 as an example, the user record for the user 20-1 includes information identifying the user 20-1 such as, for example, a user identifier (ID), a user profile of the user 20-1 which includes a number of attributes of the user 20-1, one or more locations associated with the user 20-1 which are also referred to herein as physical locations, a list of persisted or permanent friends of the user 20-1, a list of transient friends of the user 20-1, a list of recently removed friends of the user 20-1, and a list of blocked users that are to be prevented from being added as transient friends of the user 20-1. The user profile of the user 20-1 includes one or more attributes of the user 20-1 such as, for example, biographical information; demographic information; music preferences such as one or more favorite music genres, one or more favorite music artists, one or more favorite songs, or one or more favorite time periods; video preferences such as one or more favorite movie genres, one or more favorite television show genres, one or more favorite actors or actresses, one or more favorite time periods; hobbies; or the like. The attributes of the user 20-1 may also include one or more criteria defined by the user 20-1 for identifying transient friends such as, for example, biographical information describing a desired transient friend, demographic information describing a desired transient friend, music preferences of a desired transient friend, video preferences of a desired transient friend, one or more hobbies of a desired transient friend, or the like. As discussed below, in one embodiment, the list of recently removed friends also includes a time of removal for each of the recently removed friends. The time of removal is a time at which the corresponding recently removed friend was removed as a transient friend of the user 20-1.

The one or more locations associated with the user 20-1 may include a current location of the user 20-1 and, optionally, one or more previous locations of the user 20-1. In addition or alternatively, the locations associated with the user 20-1 may include, for example, a home address of the user 20-1, a work address of the user 20-1, or the like. Note that while the discussion below focuses on identifying transient friends for the user 20-1 based on a single location associated with the user 20-1 for ease of discussion, transient friends may be identified for the user 20-1 using each of any number of locations associated with the user 20-1. Alternatively, the current location of the user 20-1 may be used to identify other users within the proximate area of the user 20-1, whereas any additional locations of the user 20-1 may be considered attributes and used to identify transient friends in a manner similar to the attributes in the user profile of the user 20-1.

The user record of the user 20-1 may also include information defining or otherwise identifying a proximate area of the user 20-1. In general, the proximate area of the user 20-1 is a geographic area surrounding the user 20-1. In one embodiment, the proximate area of the user 20-1 is a circular area where the information defining the proximate area of the user 20-1 is a maximum distance or radius from the user 20-1. However, the present invention is not limited thereto. The proximate area of the user 20-1 may be defined by the user 20-1 or may be system-defined. In an alternative embodiment, rather than storing information defining the proximate area of the user 20-1 in the user profile of the user 20-1, the proximate area of the user 20-1 as well as all of the other users 20-2 through 20-N and 22 may be hard-coded into the transient friend processing function 24.

The mobile user devices 14-1 through 14-N are mobile devices. For example, each of the mobile user devices 14-1 through 14-N may be a mobile phone such as or similar to an Apple iPhone, a portable media player such as or similar to an Apple iPod® or Microsoft Zune® media player having network capabilities, a notebook computer, or the like. The mobile user devices 14-1 through 14-N generally include social networking applications 32-1 through 32-N and location determination functions 34-1 through 34-N, respectively. Using the mobile user device 14-1 as an example, the social networking application 32-1 may be implemented in software, hardware, or a combination of software and hardware. The social networking application 32-1 is generally any type of application that utilizes a social network. For example, the social networking application 32-1 may be a text-based or voice-based chat or instant messaging application, a media recommendation application, or the like. In one embodiment, the social networking application 32-1 is a social network based media recommendation application such as or similar to the one described in commonly owned and assigned U.S. patent application Ser. No. 11/484,130, entitled P2P NETWORK FOR PROVIDING REAL TIME MEDIA RECOMMENDATIONS, which was filed on Jul. 11, 2006 and is hereby incorporated herein by reference in its entirety.

The location determination function 34-1 may be implemented in software, hardware, or a combination thereof. In general, the location determination function 34-1 determines or otherwise obtains a location of the mobile user device 14-1 and provides the location to the central server 12 automatically or upon request. For example, the location determination function 34-1 may be a Global Positioning System (GPS) receiver or the like. As another example, the location determination function 34-1 may obtain the location of the mobile user device 14-1 from an external source. More specifically, if the mobile user device 14-1 has access to a wireless telecommunications network, the location of the mobile user device 14-1 may be determined by a server or some other component of the wireless telecommunications network using a technique such as, but not limited to, triangulation. If the mobile user device 14-1 has a local wireless interface such as a Bluetooth interface or one of the suite of IEEE 802.11 wireless interfaces, the mobile user device 14-1 may obtain its location from a source within its local wireless communication area. As another example, the location determination function 34-1 may obtain the location of the mobile user device 14-1 from the user 20-1. More specifically, the location determination function 34-1 may query the user 20-1 for the location of the mobile user device 14-1 or otherwise enable the user 20-1 enter the location of the mobile user device 14-1. The user 20-1 may provide the location of the mobile user device 14-1 in the form of a physical address or the like.

In an alternative embodiment, the mobile user device 14-1 does not include the location determination function 34-1, and the location of the mobile user device 14-1 is otherwise provided to or obtained by the central server 12. For example, as discussed above, the mobile user device 14-1 may be associated with a wireless telecommunications network in one embodiment. As such, a server or other component of the wireless telecommunications network may obtain the location of the mobile user device 14-1 using a technique such as, but not limited to, triangulation. The location of the mobile user device 14-1 may then be provided to the central server 12 automatically or upon request. As another alternative, the central server 12 may be a component of the wireless telecommunications network and be responsible for determining the location of the mobile user device 14-1 using a technique such as, but not limited to, triangulation.

In another alternative embodiment, the mobile user device 14-1 may transiently connect to the network 18 via a local wireless interface such as a Bluetooth wireless interface or one of the suite of IEEE 802.11 wireless interfaces. In this case, the mobile user device 14-1 may use the local wireless interface to connect to the central server 12 through distributed access points. The central server 12 may then determine the location of the mobile user device 14-1 using an Internet Protocol (IP) address of the mobile user device 14-1 or the like. Note that techniques for determining location based on an IP address are known in the art.

The stationary user device 16 may be, for example, a desktop computer or similar consumer device having network capabilities. Like the mobile user devices 14-1 through 14-N, the stationary user device 16 includes a social networking application 36, which may be implemented in software, hardware, or a combination thereof. The stationary user device 16 may include a location determination function 38. Alternatively, the location of the stationary user device 16 may be provided by the user 22, determined by the central server 12 based on an IP address of the stationary user device 16, or the like.

Note that in another embodiment, the stationary user device 16 may be a device such as a server, personal computer, or the like associated with a business or other public facility, and the user 22 may be an automated user and therefore referred to as automated user 22. As such, when the business or other public facility is within the proximate area of, for example, the user 20-1, the automated user 22 may be identified as a transient friend of the user 20-1. As a result, the automated user 22 may, for example, send information regarding the business or other public facility to the user 20-1. For example, the automated user 22 may send advertisements, media recommendations, or the like to the user 20-1.

Figure 2A:
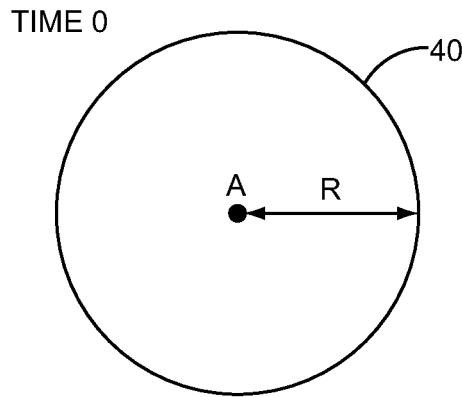
Figure 2B:
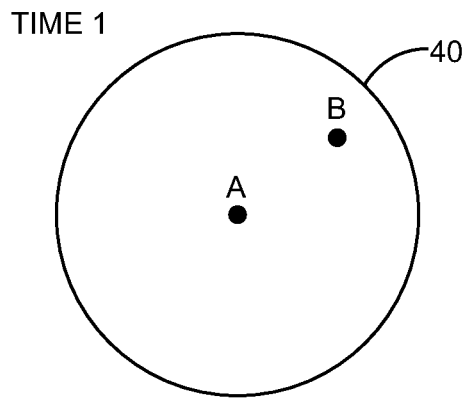
Figure 2C:
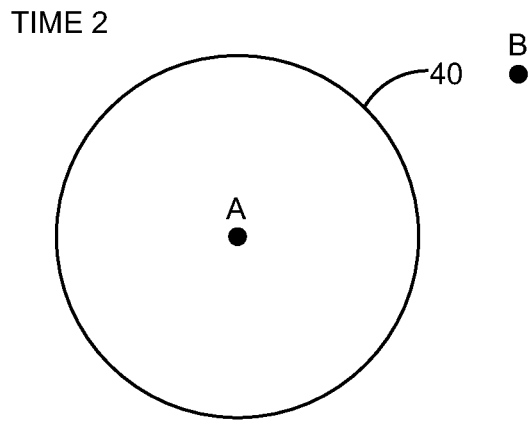

FIGS. 2A through 2C illustrate the general operation of the transient friend processing function 24 of FIG. 1 according to one embodiment of the present invention. FIG. 2A illustrates a proximate area 40 of user A. In this example, the proximate area 40 is a circular area defined by a radial distance R. However, the present invention is not limited thereto. FIG. 2B illustrates a scenario where user B has entered the proximate area 40 of user A. As discussed below, the transient friend identification function 28 first detects that user B is within the proximate area 40 of user A and then compares a user profile of user A to a user profile of user B to determine a correlation score. If the correlation score is greater than an auto-add threshold, user B is automatically added as a transient friend of user A. If the correlation score is less than the auto-add threshold but greater than a manual-add threshold, user A is notified of user B and enabled to choose whether to add user B as a transient friend. In this example, assume that user B has been added as a transient friend of user A.

FIG. 2C illustrates a scenario where user B, after being added as a transient friend of user A, is no longer within the proximate area 40 of user A. As discussed below, the transient friend monitoring function 30 first detects that user B is outside the proximate area 40 of user A and then determines whether to remove user B as a transient friend of user A. In one embodiment, after user B has been outside the proximate area 40 for an amount of time equal to or greater than a proximity exit delay, the transient friend monitoring function 30 notifies user A and enables user A to choose whether to promote user B from a transient friend to a persisted friend or to remove user B as a transient friend. Alternatively, the transient friend monitoring function 30 may automatically remove user B as a transient friend of user A.

Figure 3A:
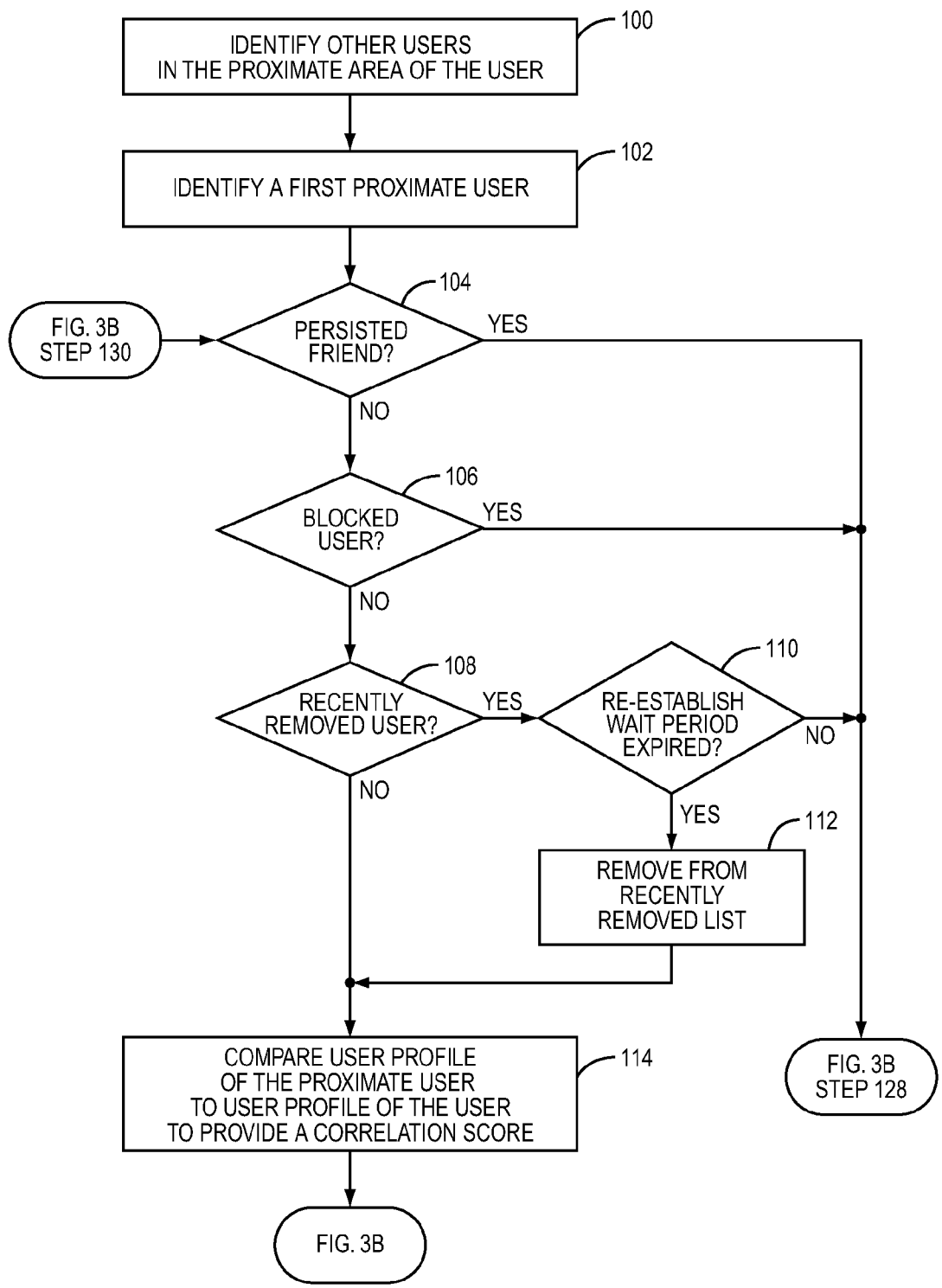
FIGS. 3A and 3B are flow charts illustrating the operation of the transient friend processing function to identify transient friends according to one embodiment of the present invention.
Figure 3B:
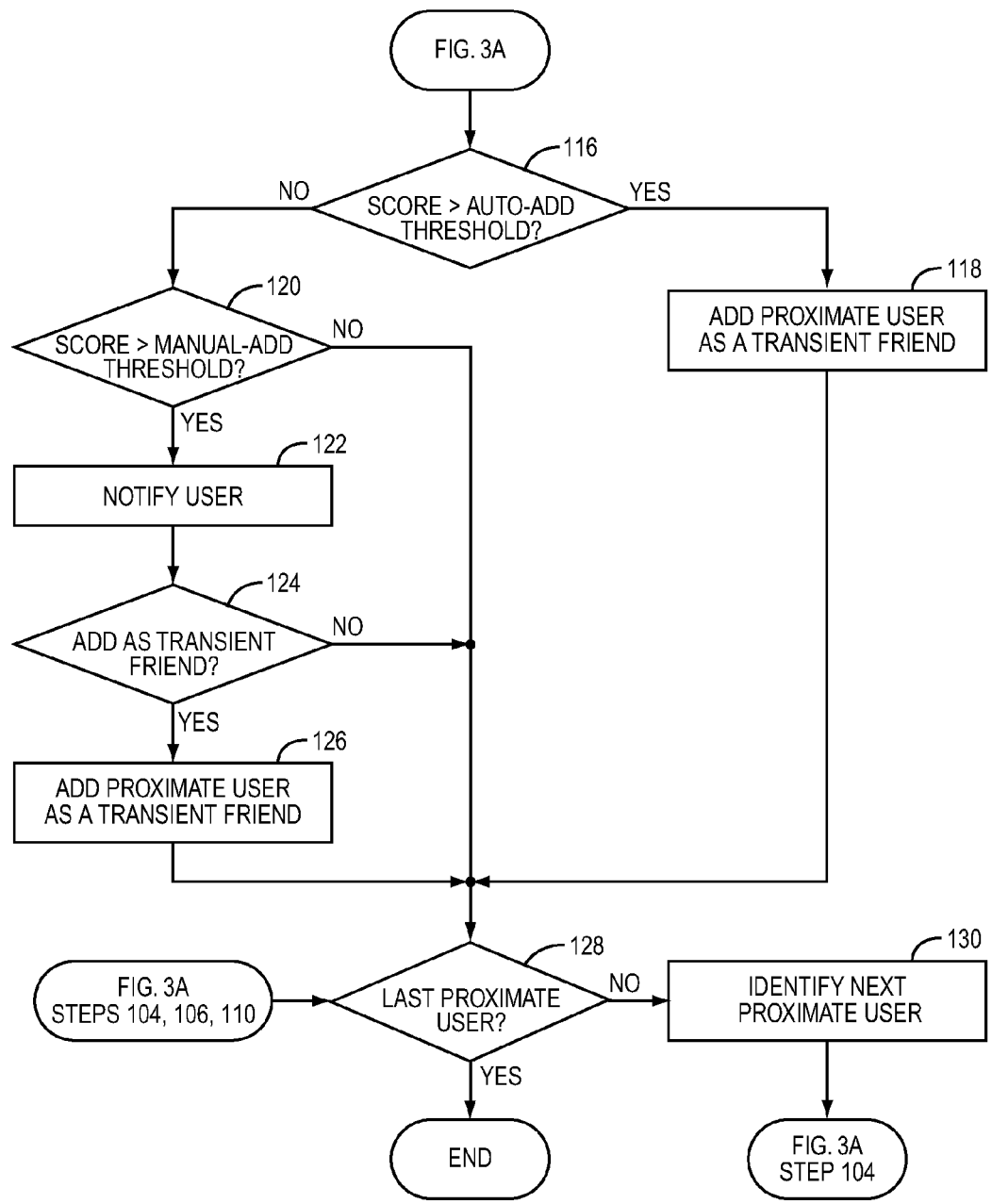

FIGS. 3A and 3B are flow charts illustrating the operation of the transient friend identification function 28 according to one embodiment of the present invention. Note that although the following process is discussed as being performed to identify transient friends of the user 20-1, the process is also performed to identify transient friends of each of the other users 20-2 through 20-N and 22. First, the transient friend identification function 28 identifies one or more users from the other users 20-2 through 20-N and 22 within the proximate area of the user 20-1 to create a list of proximate users (step 100). A first proximate user from the list of proximate users is identified (step 102). The transient friend identification function 28 then determines whether the proximate user is a persisted friend (step 104). More specifically, in order to determine whether the proximate user is a persisted friend of the user 20-1, the transient friend identification function 28 may compare a user ID of the proximate user to the list of persisted friends for the user 20-1. If the proximate user is in the list of persisted friends for the user 20-1, then the proximate user is already a persisted friend of the user 20-1. If the proximate user is a persisted friend of the user 20-1, the process proceeds to step 128 (FIG. 3B).

If the proximate user is not a persisted friend of the user 20-1, the transient friend identification function 28 then determines whether the proximate user is a user blocked by the user 20-1 (step 106). More specifically, in order to determine whether the proximate user is a user blocked by the user 20-1, the transient friend identification function 28 may compare a user ID of the proximate user to the list of blocked users for the user 20-1. If the proximate user is in the list of blocked users for the user 20-1, then the proximate user is a user blocked by the user 20-1. If the proximate user is a blocked user, the process proceeds to step 128 (FIG. 3B).

If the proximate user is not a blocked user, the transient friend identification function 28 then determines whether the proximate user is a user recently removed as a transient friend of the user 20-1 (step 108). More specifically, in order to determine whether the proximate user is a user recently removed as a transient friend of the user 20-1, the transient friend identification function 28 may compare a user ID of the proximate user to a list of recently removed users for the user 20-1. If the proximate user is in the list of recently removed users for the user 20-1, then the proximate user is a user recently removed by the user 20-1. If the proximate user is not a recently removed user, the process proceeds to step 114.

In this embodiment, if the proximate user is a recently removed user, the transient friend identification function 28 then determines whether a re-establish wait period for the proximate user has expired (step 110). The re-establish wait period is a user-defined or system-defined amount of time that must expire before a user removed as a transient friend can be re-established as a transient friend. In order to determine whether the re-establish wait period has expired, the transient friend identification function 28 may first determine an expiration time corresponding to a removal time identifying a time at which the proximate user was removed as a transient friend of the user 20-1 plus the amount of time defined by the re-establish wait period. If the current time is after the expiration time, then the re-establish wait period has expired. Otherwise, the re-establish wait period has not expired. If the re-establish wait period has not expired, the process proceeds to step 128 (FIG. 3B). If the re-establish wait period has expired, the transient friend identification function 28 removes the proximate user from the recently removed friends list for the user 20-1 (step 112).

At this point, the transient friend identification function 28 compares the user profile of the proximate user to the user profile of the user 20-1 to provide a correlation score (step 114). The correlation score may be provided using any desired comparison technique. For example, the correlation score may be a number of attributes from the user profile of the proximate user that match or are within some defined range of corresponding attributes from the user profile of the user 20-1, or vice versa. As another example, the correlation score may be provided as a percentage of attributes in the user profile of the proximate user that match or are within a defined range of corresponding attributes in the user profile of the user 20-1, or vice versa. Note that weights may be assigned to user attributes such that some user attributes affect the correlation score more than others.

Note that comparing the user profile of the proximate user to the user profile of the user 20-1 to provide a correlation score is optional. Alternatively, all other users within the proximate area of the user 20-1 may be added as transient friends of the user 20-1. In another alternative embodiment, up to some defined maximum number of the other users within the proximate area of the user 20-1 may be added as transient friends of the user 20-1. As another alternative embodiment, up to a defined maximum number of other users that are closest to the location of the user 20-1 may be added as transient friends of the user 20-1. Note that these alternative embodiments are exemplary. Other types of criteria may be used in order to select transient friends from other users within the proximate area of the user 20-1.

Once the correlation score is determined, the transient friend identification function 28 determines whether the correlation score is greater than an auto-add threshold (step 116). The auto-add threshold may be a user-defined threshold or a system-defined threshold. Further, the auto-add threshold may be static or dynamic. For example, the user 20-1 may adjust the auto-add threshold when desired. As another example, the transient friend identification function 28 may dynamically change the auto-add threshold as a function of factors such as, for example, a number of transient friends in the transient friends list of the user 20-1, a number of transient friends in the transient friends list of the user 20-1 as compared to a desired number of transient friends, a total number of persisted friends and transient friends of the user 20-1, a total number of persisted friends and transient friends of the user 20-1 as compared to a desired number of persisted and transient friends, or the like.

If the correlation score is greater than the auto-add threshold, the transient friend identification function 28 adds the proximate user to the list of transient friends for the user 20-1 (step 118). The process then proceeds to step 128. If the correlation score is less than the auto-add threshold, the transient friend identification function 28 determines whether the correlation score is greater than a manual-add threshold (step 120). The manual-add threshold may be a user-defined threshold defined by the user 20-1 or a system-defined threshold. Further, the manual-add threshold may be static or dynamic. For example, the user 20-1 may adjust the manual-add threshold when desired. As another example, the transient friend identification function 28 may dynamically change the manual-add threshold as a function of factors such as, for example, a number of transient friends in the transient friends list of the user 20-1, a number of transient friends in the transient friends list of the user 20-1 as compared to a desired number of transient friends, a total number of persisted friends and transient friends of the user 20-1, a total number of persisted friends and transient friends of the user 20-1 as compared to a desired number of persisted and transient friends, or the like. Note that the manual-add threshold may be any desired value less than or equal to the auto-add threshold. Further, if desired, the manual-add threshold may be zero such that the user 20-1 is given the option to choose whether to add proximate users as transient friends for all proximate users having correlation scores less than the auto-add threshold. In contrast, the manual-add score may be set equal to the auto-add threshold such that all proximate users having correlation scores less than the auto-add threshold are not added as transient friends of the user 20-1.

If the correlation score is not greater than the manual-add threshold, the process proceeds to step 128. If the correlation score is greater than the manual-add threshold, the transient friend identification function 28 notifies the user 20-1 and enables the user 20-1 to choose whether to add the proximate user as a transient friend (step 122). The notification may include information identifying the proximate user, the correlation score, one or more of the attributes of the proximate user from the user profile of the proximate user, or the like. Based on a response from the user 20-1, the transient friend identification function 28 determines whether to add the proximate user as a transient friend for the user 20-1 (step 124). If the user 20-1 has chosen not to add the proximate user as a transient friend, the process proceeds to step 128. Otherwise, the transient friend identification function 28 adds the proximate user to the list of transient friends for the user 20-1 (step 126).

At this point, the transient friend identification function 28 determines whether the proximate user is the last proximate user in the list of proximate users provided in step 102 (step 128). If not, a next proximate user in the list of proximate users is identified (step 130), and then the process returns to step 104 (FIG. 3A). Once the last proximate user in the list of proximate users is processed, the process ends. Note that transient friend identification function 28 may then perform the process of FIGS. 3A and 3B for each of the other users 20-2 through 20-N and 22. Alternatively, the transient friend identification function 28 may include a separate thread or process for each of the users 20-1 through 20-N and 22.

Note that, in the embodiment described above, the correlation score is implemented such that the proximate user is automatically added as a transient friend if the correlation score is greater than the auto-add threshold. If not, the proximate user may be manually added as a transient friend if the correlation score is greater than the manual-add threshold. However, the correlation score may alternatively be implemented such that the proximate user is automatically added as a transient friend if the correlation score is less than an auto-add threshold and may be manually added as a transient friend if the correlation score is greater than the auto-add threshold but less than a manual-add threshold.

Figure 4:
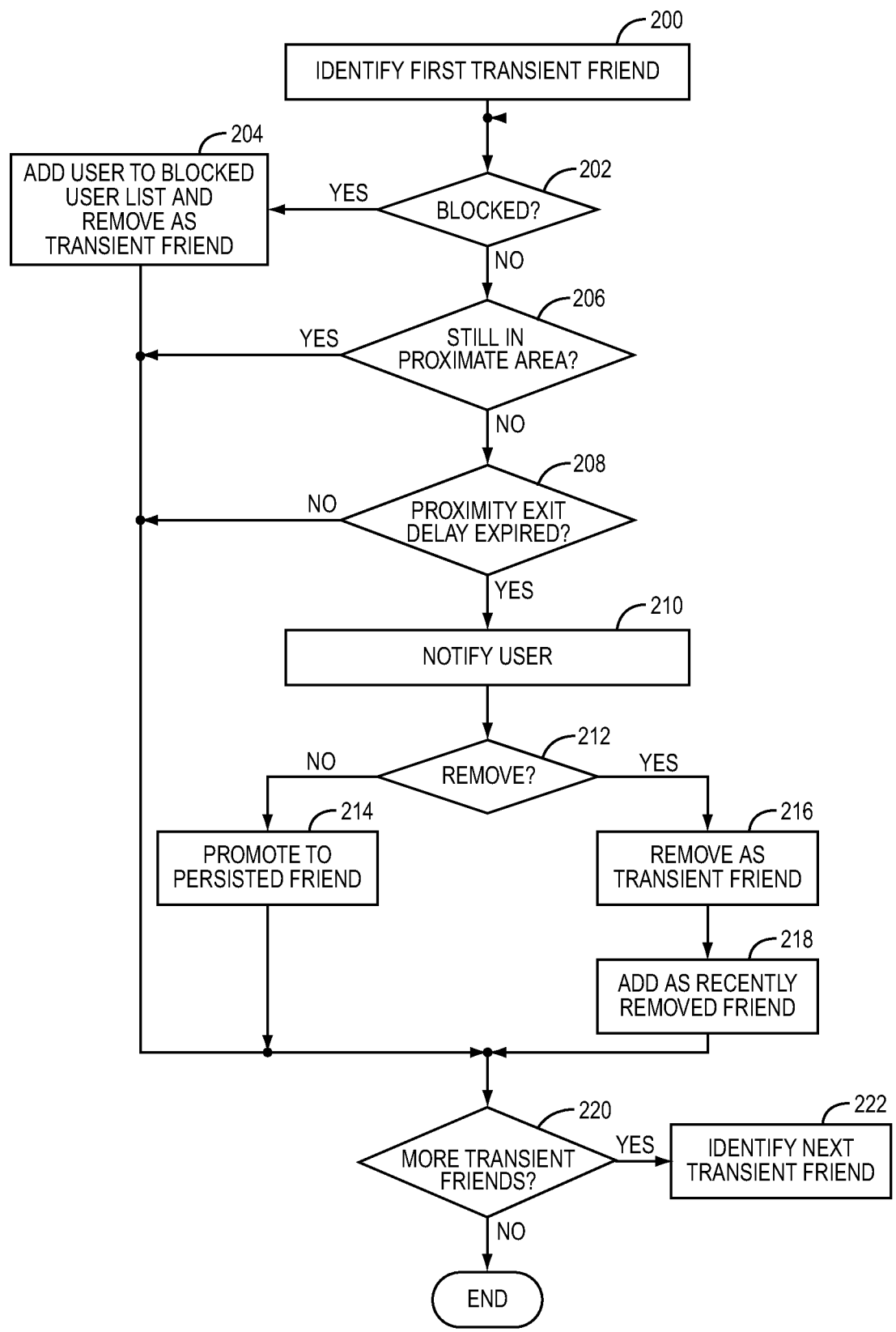
FIG. 4 is a flow chart illustrating the operation of the transient friend processing function to monitor transient friends according to one embodiment of the present invention.

FIG. 4 is a flow chart illustrating the operation of the transient friend monitoring function 30 of FIG. 1 according to one embodiment of the present invention. Note that while the following process is discussed as being performed to monitor the transient friends of the user 20-1, the process is also performed to monitor the transient friends of each of the other users 20-2 through 20-N and 22. First, the transient friend monitoring function 30 identifies a first transient friend in the list of transient friends of the user 20-1 (step 200). Next, the transient friend monitoring function 30 determines whether the user 20-1 has issued a block request for the transient friend (step 202). More specifically, in one embodiment, the user 20-1 may select one or more users identified as transient friends and choose to block the selected users from being transient friends. If the user 20-1 has issued a block request for the transient friend, the transient friend monitoring function 30 adds the corresponding user to the list of blocked users for the user 20-1, removes the corresponding user as a transient friend of the user 20-1, and proceeds to step 220 (step 204).

If the user 20-1 has not issued a block request for the transient friend, the transient friend monitoring function 30 determines whether the transient friend is still in the proximate area of the user 20-1 (step 206). If so, the process proceeds to step 220. In an alternative embodiment, before proceeding to step 220, the transient friend monitoring function 30 may determine whether the user profile of the transient friend or the user profile of the user 20-1 has changed. If so, the correlation score is updated. If the updated correlation score is below an auto-removal threshold, the transient friend may be automatically removed. If the updated correlation score is greater than the auto-removal threshold but less than a manual-remove threshold, the user 20-1 may be notified and enabled to choose whether to remove the transient friend.

Returning to step 206, if the transient friend is not in the proximate area of the user 20-1, the transient friend monitoring function 30 determines whether a proximity exit delay for the transient friend has expired (step 208). More specifically, in one embodiment, a time is recorded upon first detecting that the transient friend is no longer within the proximate area of the user 20-1. The proximity exit delay defines an amount of time that the transient friend must remain outside of the proximate area of the user 20-1 before being removed as a transient friend of the user 20-1. Thus, in order for the proximity exit delay to expire, more than one iteration of the process of FIG. 4 may be required between the time at which the transient friend is first detected as being outside the proximate area of the user 20-1 and the time at which the proximity exit delay has expired. If the proximity exit delay has not expired, the process proceeds to step 220.

In this embodiment, if the proximity exit delay has expired, the transient friend monitoring function 30 notifies the user 20-1 and enables the user 20-1 to choose whether to add the transient friend as a persisted friend or to allow the transient friend to be removed (step 210). Alternatively, the transient friend may automatically be removed. Based on a response from the user 20-1, the transient friend monitoring function 30 determines whether to remove the transient friend (step 212). If the transient friend is not to be removed, the transient friend monitoring function 30 promotes the transient friend to a persisted friend (step 214). More specifically, the corresponding user is removed from the transient friends list of the user 20-1 and added to the persisted friends list of the user 20-1.

If the user 20-1 chooses to remove the transient friend, the transient friend monitoring function 30 removes the corresponding user from the transient friends list of the user 20-1 (step 216). The transient friend monitoring function 30 also adds the corresponding user as a recently removed friend (step 218). More specifically, the corresponding user is added to the list of recently removed friends for the user 20-1. In addition, if the use of a re-establish wait period is desired, the current time is recorded as a time of removal for the corresponding user.

At this point, the transient friend monitoring function 30 determines whether there are more transient friends in the transient friends list of the user 20-1 (step 220). If so, a next transient friend is identified (step 222), and the process returns to step 202 and is repeated. Once the last transient friend is processed, the process ends. Note that transient friend monitoring function 30 may then perform the process of FIG. 4 for each of the other users 20-2 through 20-N and 22. Alternatively, the transient friend monitoring function 30 may include a separate thread or process for each of the users 20-1 through 20-N and 22.

FIG. 5 is a graphical illustration of the operation of the transient friend processing function 24 of FIG. 1 including the use of a re-establish wait period and a proximity exit delay according to one embodiment of the present invention. More specifically, four scenarios, scenarios A through D, are illustrated. In each scenario, a relationship of users A and B are graphically depicted as user B comes inside a proximate area of user A, goes outside of the proximate area of user A, and then comes back inside the proximate area of user A.

In scenario A, at an initial time, Time 0, user B is initially not within the proximate area of user A. As such, there is no relationship between users A and B. At Time 1, user B comes within the proximate area of user A. Assuming that the conditions for adding user B as a transient friend of user A are satisfied, user B is then added as a transient friend of user A. Thereafter, at Time 2, user B goes outside of the proximate area of user A. In this scenario, user B does not re-enter the proximate area of user A before the proximity exit delay has expired. As a result, user B is removed as a transient friend of user A. When user B is removed as a transient friend of user A, a time of removal is recorded. User B is prevented from being re-established as a transient friend of user A until a re-establish wait period starting from the time of removal has expired. In this example, user B re-enters the proximate area of user A at Time 3. However, the re-establish wait period has not expired. As such, user B is prevented from being added as a transient friend of user A. When the re-establish wait period expires, user B is still in the proximate area of user A. As such, user B is then re-established as a transient friend of user A.

In scenario B, at the initial time, Time 0, user B is initially not within the proximate area of user A. As such, there is no relationship between users A and B. At Time 1, user B comes within the proximate area of user A. Assuming that the conditions for adding user B as a transient friend of user A are satisfied, user B is then added as a transient friend of user A. Thereafter, at Time 2, user B goes outside of the proximate area of user A. However, in this scenario, user B re-enters the proximate area of user A before the proximity exit delay has expired. As a result, user B is not removed as a transient friend of user A.

In scenario C, at the initial time, Time 0, user B is initially not within the proximate area of user A. As such, there is no relationship between users A and B. At Time 1, user B comes within the proximate area of user A. Assuming that the conditions for adding user B as a transient friend of user A are satisfied, user B is then added as a transient friend of user A. Thereafter, at some time while user B is in the proximate area of user A, user A requests that user B be promoted from a transient friend to a persisted friend. As such, user B is added to the list of persisted friends of user A and, therefore, remains a friend of user A regardless of location and similarity of user attributes. Note, however, that user A may thereafter choose to remove user B as a persisted friend if desired.

In scenario D, at the initial time, Time 0, user B is initially not within the proximate area of user A. As such, there is no relationship between users A and B. At Time 1, user B comes within the proximate area of user A. Assuming that the conditions for adding user B as a transient friend of user A are satisfied, user B is then added as a transient friend of user A. Thereafter, at some time while user B is in the proximate area of user A, user A requests that user B be blocked. As such, user B is removed as a transient friend of user A and is thereafter prevented from being added as a transient friend of user A.

FIG. 6 is a block diagram of an exemplary embodiment of the central server 12 of FIG. 1. In general, the central server 12 includes a control system 42 having associated memory 44. In this embodiment, the transient friend processing function 24 is implemented in software and stored in the memory 44. However, the present invention is not limited thereto. The central server 12 also includes one or more digital storage devices 46 such as, for example, one or more hard disk drives or the like. The user records 26 may be stored by the one or more digital storage devices 46. Alternatively, the user records 26 may be stored remotely and be accessible to the central server 12. The central server 12 also includes a communication interface 48 communicatively coupling the central server 12 to the network 18 (FIG. 1). Lastly, the central server 12 includes a user interface 50, which may include components such as, for example, a display, one or more user input devices, and the like.

FIG. 7 is a block diagram of an exemplary embodiment of the mobile user device 14-1 of FIG. 1. This discussion is applicable to the other mobile user devices 14-2 through 14-N and the stationary user device 16. In general, the mobile user device 14-1 includes a control system 52 having associated memory 54. In this embodiment, the social networking application 32-1 is implemented in software and stored in the memory 54. However, the present invention is not limited thereto. As discussed above, the mobile user device 14-1 may also include the location determination function 34-1. The mobile user device 14-1 also includes one or more digital storage devices 56 such as, for example, one or more hard disk drives or the like. The mobile user device 14-1 also includes a communication interface 58 communicatively coupling the mobile user device 14-1 to the network 18 (FIG. 1). Lastly, the mobile user device 14-1 includes a user interface 60, which may include components such as, for example, a display, one or more user input devices, a speaker, and the like.

Those skilled in the art will recognize improvements and modifications to the preferred embodiments of the present invention. All such improvements and modifications are considered within the scope of the concepts disclosed herein and the claims that follow.

What is claimed is:

1. A method for manipulating a friend list within a social network for a first user comprising:
   selecting a second user from a list of users proximate the first user;
   determining whether the second user is a persisted friend of the first user within the social network;
   identifying the second user that is associated with a location within a proximate area of the first user as a possible transient friend of the first user in the social network of the first user if the second user is not a persisted friend of the first user with the social network;
   adding the second user as a transient friend of the first user; and
   after adding the second user as a transient friend of the first user, monitoring the second user such that a status of the second user as a transient friend of the first user is based upon whether the second user continues to be associated with a location within the proximate area of the first user.

2. The method of claim 1 wherein monitoring the second user comprises:
   determining that the second user is no longer associated with a location within the proximate area of the first user;

waiting at least an amount of time defined by a proximity exit delay after determining that the second user is no longer associated with a location within the proximate area of the first user;

after waiting the at least an amount of time defined by the proximity exit delay, determining whether the second user is associated with a location outside the proximate area of the first user; and if a determination is made that the second user is associated with a location outside the proximate area of the first user after waiting the at least an amount of time defined by the proximity exit delay, removing the second user as a transient friend of the first user.

3. The method of claim 1 wherein monitoring the second user comprises removing the second user as a transient friend of the first user when the second user is no longer associated with a location within the proximate area of the first user.

4. The method of claim 3 further comprising re-establishing the second user as a transient friend of the first user when the second user is again associated with a location within the proximate area of the first user.

5. The method of claim 3 further comprising:

determining when the second user is again associated with a location within the proximate area of the first user;

determining whether a re-establish wait period has expired since the second user was removed as a transient friend of the first user; and if the re-establish wait period has expired, adding the second user as a transient friend of the first user.

6. The method of claim 3 further comprising:

determining when the second user is again associated with a location within the proximate area of the first user;

determining whether a re-establish wait period has expired since the second user was removed as a transient friend of the first user; and if the re-establish wait period has expired:

determining whether to add the second user as a transient friend of the first user in the social network of the first user as a function of a comparison of at least one attribute of the first user and at least one attribute of the second user; and adding the second user as a transient friend of the first user if a determination is made to add the second user as a transient friend of the first user.

7. The method of claim 1 wherein monitoring the second user comprises:

determining when the second user is no longer associated with a location within the proximate area of the first user;

notifying the first user such that the first user is enabled to choose whether to remove the second user as a transient friend of the first user;

if the first user chooses to remove the second user as a transient friend, removing the second user as a transient friend of the first user; and if the first user chooses not to remove the second user, promoting the second user from a transient friend to a persisted friend of the first user.

8. The method of claim 1 wherein identifying the second user that is associated with a location within the proximate area of the first user as a transient friend of the first user comprises:

determining whether to add the second user as a transient friend of the first user in the social network of the first user as a function of a comparison of at least one attribute of the first user and at least one attribute of the second user; and adding the second user as a transient friend of the first user if a determination is made to add the second user as a transient friend of the first user.

9. The method of claim 8 wherein determining whether to add the second user as a transient friend of the first user comprises:

comparing the at least one attribute of the first user and the at least one attribute of the second user to provide a correlation score; and determining that the second user is to be added as a transient friend of the first user if the correlation score is greater than a first threshold.

10. The method of claim 9 further comprising, if the correlation score is less than the first threshold:

determining whether the correlation score is greater than a second threshold; and if the correlation score is greater than the second threshold:

notifying the first user of the second user such that the first user is enabled to choose whether to add the second user as a transient friend; and adding the second user as a transient friend of the first user if the first user chooses to add the second friend as a transient friend.

11. The method of claim 9 wherein monitoring the second user comprises monitoring the second user such that the status of the second user as a transient friend of the first user is based upon changes to the at least one attribute of the first user and the at least one attribute of the second user as well as whether the second user continues to be associated with a location within the proximate area of the first user.

12. The method of claim 11 wherein monitoring the second user further comprises, after adding the second user as a transient friend of the first user:

comparing the at least one attribute of the first user and the at least one attribute of the second user to update the correlation score such that the correlation score is updated in response to changes in the at least one attribute of the first user and the at least one attribute of the second user; and removing the second user as a transient friend of the first user if the correlation score falls below a second threshold that is less than or equal to the first threshold.

13. The method of claim 11 wherein monitoring the second user further comprises, after adding the second user as a transient friend of the first user:

comparing the at least one attribute of the first user and the at least one attribute of the second user to update the correlation score such that the correlation score is updated in response to any changes in the at least one attribute of the first user and the at least one attribute of the second user;

notifying the first user if the correlation score falls below a second threshold that is less than or equal to the first threshold such that the first user is enabled to choose whether to remove the second user as a transient friend of the first user;

if the first user chooses to remove the second user, removing the second user as a transient friend of the first user; and if the first user chooses not to remove the second user, promoting the second user from a transient friend to a persisted friend of the first user.

14. The method of claim 1 further comprising:

receiving a request to promote the second user from a transient friend of the first user to a persisted friend of the first user in the social network of the first user; and in response to the request, promoting the second user from a transient friend of the first user to a persisted friend of the first user.

15. The method of claim 1 further comprising:
receiving a request to block the second user from being a transient friend of the first user in the social network of the first user; and
in response to the request:
removing the second user as a transient friend of the first user; and
subsequently preventing the second user from being added as a transient friend of the first user.

16. The method of claim 1 wherein the second user is one of the group consisting of: a person and an automated person.

17. A system comprising:
a communication interface communicatively coupling the system to a plurality of user devices associated with a plurality of users via a communication network; and
a control system associated with the communication interface and adapted to:
obtain information identifying a location associated with each of the plurality of users;
create a list of users proximate a first user;
select a second user from the list of users proximate a first user;
determine whether the second user is a persisted friend of the first user within a social network;
identify the second user of the plurality of users that is associated with a location within a proximate area of the first user as a transient friend of the first user in the social network of the first user;
add the second user as a transient friend of the first user; and
after adding the second user as a transient friend of the first user, monitor the second user such that a status of the second user as a transient friend of the first user is based upon whether the second user continues to be associated with a location within the proximate area of the first user.

18. The system of claim 17 wherein in order to monitor the second user, the control system is further adapted to:
determine that the second user is no longer associated with a location within the proximate area of the first user;
wait at least an amount of time defined by a proximity exit delay after determining that the second user is no longer associated with a location within the proximate area of the first user;
after waiting the at least an amount of time defined by the proximity exit delay, determine whether the second user is associated with a location outside the proximate area of the first user; and
remove the second user as a transient friend of the first user if a determination is made that the second user is associated with a location outside the proximate area of the first user after waiting the at least an amount of time defined by the proximity exit delay.

19. The system of claim 17 wherein in order to monitor the second user, the control system is further adapted to remove the second user as a transient friend of the first user when the second user is no longer associated with a location within the proximate area of the first user.

20. The system of claim 19 wherein the control system is further adapted to:
determine when the second user is again associated with a location within the proximate area of the first user;
determine whether a re-establish wait period has expired since the second user was removed as a transient friend of the first user; and
add the second user as a transient friend of the first user if the re-establish wait period has expired.

21. The system of claim 19 wherein the control system is further adapted to:
determine when the second user is again associated with a location within the proximate area of the first user;
determine whether a re-establish wait period has expired since the second user was removed as a transient friend of the first user; and
if the re-establish wait period has expired,
determine whether to add the second user as a transient friend of the first user in the social network of the first user as a function of a comparison of at least one attribute of the first user and at least one attribute of the second user; and
add the second user as a transient friend of the first user if a determination is made to add the second user as a transient friend of the first user.

22. The system of claim 17 wherein in order to monitor the second user, the control system is further adapted to:
determine when the second user is no longer associated with a location within the proximate area of the first user;
notify the first user such that the first user is enabled to choose whether to remove the second user as a transient friend of the first user;
remove the second user as a transient friend of the first user if the first user chooses to remove the second user as a transient friend; and
promote the second user from a transient friend to a persisted friend of the first user if the first user chooses not to remove the second user.

23. The system of claim 17 wherein in order to identify the second user that is associated with a location within the proximate area of the first user as a transient friend of the first user, the control system is further adapted to:
determine whether to add the second user as a transient friend of the first user in the social network of the first user as a function of a comparison of at least one attribute of the first user and at least one attribute of the second user; and
add the second user as a transient friend of the first user if a determination is made to add the second user as a transient friend of the first user.

24. The system of claim 23 wherein in order to determine whether to add the second user as a transient friend of the first user, the control system is further adapted to:
compare the at least one attribute of the first user and the at least one attribute of the second user to provide a correlation score; and
determine that the second user is to be added as a transient friend of the first user if the correlation score is greater than a first threshold.

25. The system of claim 24 wherein, if the correlation score is less than the first threshold, the control system is further adapted to:
determine whether the correlation score is greater than a second threshold; and
if the correlation score is greater than the second threshold:
notify the first user of the second user such that the first user is enabled to choose whether to add the second user as a transient friend; and
add the second user as a transient friend of the first user if the first user chooses to add the second user as a transient friend.

26. A method comprising:
identifying as possible transient friends of a first user one or more second users associated with a location associated with the first user and who are members of a social network of the first user and who are not already associated with the first user;

adding at least one of the one or more second users as a transient friend of the first user; and after adding the second user as a transient friend of the first user, monitoring the second user such that a status of the second user as a transient friend of the first user is based upon whether the second user continues to be associated with a location within a proximate area of the first user.

27. A system comprising:

a communication interface communicatively coupling the system to a plurality of user devices associated with a plurality of users via a communication network; and a control system associated with the communication interface and adapted to:

identify as possible transient friends of a first user one or more second users associated with a location associated with the first user and who are members of a social network of the first user and who are not already associated with the first user;

add at least one of the one or more second users as a transient friend of the first user; and after adding the second user as a transient friend of the first user, monitor the second user such that a status of the second user as a transient friend of the first user is based upon whether the second user continues to be associated with a location within a proximate area of the first user.

28. A non-transitory computer readable medium comprising software with instructions to:

identify as possible transient friends of a first user one or more second users associated with a location associated with the first user and who are members of a social network of the first user and who are not already associated with the first user;

add at least one of the one or more second users as a transient friend of the first user; and after adding the second user as a transient friend of the first user, monitor the second user such that a status of the second user as a transient friend of the first user is based upon whether the second user continues to be associated with a location within a proximate area of the first user.

29. A non-transitory computer readable medium comprising software with instructions to:

select a second user from a list of users proximate a first user;

determine whether the second user is a persisted friend of the first user within a social network;

identify the second user that is associated with a location within a proximate area of the first user as a possible transient friend of the first user in the social network of the first user if the second user is not a persisted friend of the first user with the social network;

add the second user as a transient friend of the first user; and after adding the second user as a transient friend of the first user, monitor the second user such that a status of the second user as a transient friend of the first user is based upon whether the second user continues to be associated with a location within the proximate area of the first user.

30. A first user device comprising:

a communication interface communicatively coupling the first user device to a plurality of user devices associated with a plurality of users via a communication network; and a control system associated with the communication interface and adapted to:

obtain information identifying a location associated with each of a plurality of user devices;

create a list of user devices proximate to the first user device;

select a second user device from the list of user devices proximate to the first user device;

determine whether a second user of the second user device is a persisted friend of a first user of the first user device in the social network of the first user;

add the second user as a transient friend in the social network of the first user; and monitor the location associated with the second user device such that the status of the second user as a transient friend in the social network of the first user is based upon whether the second user device continues to be associated with a location within the proximate area of the first user device.

31. The first user device of claim 30 wherein in order to monitor the second user, the control system is further adapted to:

determine that the second user device is no longer associated with a location within the proximate area of the first user device;

wait at least an amount of time defined by a proximity exit delay after determining that the second user device is no longer associated with a location within the proximate area of the first user device;

after waiting the at least an amount of time defined by the proximity exit delay, determine whether the second user device is associated with a location outside the proximate area of the first user device; and remove the second user as a transient friend of the first user if a determination is made that the second user device is associated with a location outside the proximate area of the first user device after waiting the at least an amount of time defined by the proximity exit delay.

32. The first user device of claim 30 wherein in order to monitor the location associated with the second user device, the control system is further adapted to remove the second user as a transient friend of the first user when the second user device is no longer associated with a location within the proximate area of the first user device.

33. The first user device of claim 32 wherein the first user device is further adapted to:

determine when the second user device is again associated with a location within the proximate area of the first user device;

determine whether a re-establish wait period has expired since the second user was removed as a transient friend of the first user; and add the second user as a transient friend of the first user if the re-establish wait period has expired.

34. The first user device of claim 32 wherein the control system is further adapted to:

determine when the second user device is again associated with a location within the proximate area of the first user device;

determine whether a re-establish wait period has expired since the second user was removed as a transient friend of the first user; and if the re-establish wait period has expired, determine whether to add the second user as a transient friend of the first user in the social network of the first user as a function of a comparison of at least one attribute of the first user and at least one attribute of the second user; and add the second user as a transient friend of the first user if a determination is made to add the second user as a transient friend of the first user.

35. The system of claim 30 wherein in order to monitor the location associated with the second user device, the control system is further adapted to:
  determine when the second user device is no longer associated with a location within the proximate area of the first user device;
  notify the first user device such that the first user is enabled to choose whether to remove the second user as a transient friend of the first user;
  remove the second user as a transient friend of the first user if the first user chooses to remove the second user as a transient friend; and
  promote the second user from a transient friend to a persisted friend of the first user if the first user chooses not to remove the second user.

36. The system of claim 30 wherein in order to determine whether the second user of the second user device is a persisted friend of a first user, the control system is further adapted to:
  determine whether to add the second user as a transient friend of the first user in the social network of the first user as a function of a comparison of at least one attribute of the first user and at least one attribute of the second user.

37. The system of claim 36 wherein in order to determine whether to add the second user as a transient friend of the first user, the control system is further adapted to:
  compare the at least one attribute of the first user and the at least one attribute of the second user to provide a correlation score; and
  determine that the second user is to be added as a transient friend of the first user if the correlation score is greater than a first threshold.

38. The system of claim 37 wherein, if the correlation score is less than the first threshold, the control system is further adapted to:
  determine whether the correlation score is greater than a second threshold; and
  if the correlation score is greater than the second threshold:
    notify the first user device of the second user such that the first user is enabled to choose whether to add the second user as a transient friend; and
    add the second user as a transient friend of the first user if the first user chooses to add the second user as a transient friend.

* * * * *